Figure 1:
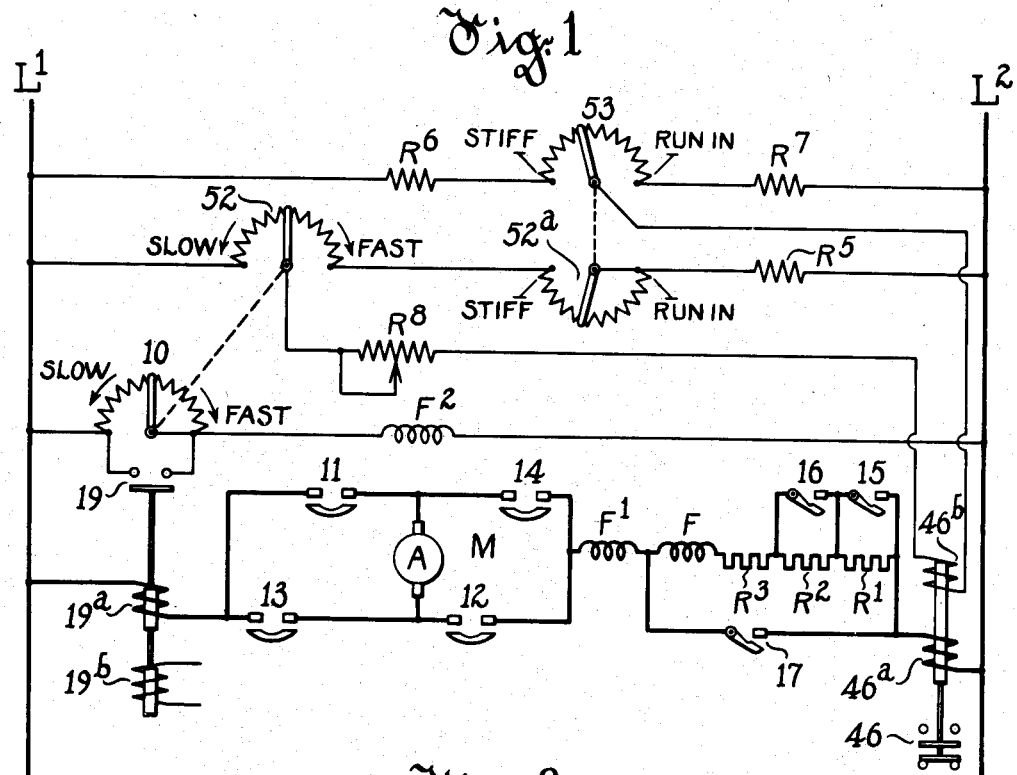

April 23, 1946.    E. PELL    2,399,059

MOTOR CONTROLLER

Filed Oct. 30, 1943

Inventor
Eric Pell
By Frank H. Hubbard
Attorney

Patented Apr. 23, 1946

2,399,059

UNITED STATES PATENT OFFICE 2,399,059

MOTOR CONTROLLER

Eric Pell, Shorewood, Wis., assignor to Cutler-Hammer, Inc., Milwaukee, Wis., a corporation of Delaware Application October 30, 1943, Serial No. 508,413

3 Claims. (Cl. 172—179)

This invention relates to motor controllers and is particularly applicable to controllers for direct current variable speed motors which are employed to drive machines such as metal draw benches.

The patent to J. M. Newman, No. 2,057,909, of October 20, 1936 and the co-pending application of J. M. Newman, Serial No. 461,961, filed October 14, 1942, each disclose a draw bench controller having a load responsive relay for effecting automatic slowdown of the driving motor when the draw bench becomes unloaded for any reason; as for example, if the material breaks during a drawing operation or when the end of the material leaves the die. The load relay in each of these controllers is controlled by a series coil and a shunt coil, the former being connected in the armature circuit of the motor, and the latter being provided with a compensating control means. This compensating control means includes two rheostats, one being associated with a shunt field speed regulating rheostat for the motor to compensate for different motor speeds, and the other being adjustable to compensate for load variations caused by wear-in of the drawing mechanism from a new or stiff condition to a run-in condition. While these rheostats compensate to some extent for speed and load variations it has been found impossible to design the same to insure response of the load relay immediately upon unloading of the draw bench under all operating conditions, and the present invention has among its objects to provide an improved compensating control which overcomes this objection.

Another object is to provide a controller of the aforesaid type with improved compensating means including standardized rheostats which are capable of effecting proper control of the load relay regardless of the size of the driving motor.

Various other objects and advantages of the invention will hereinafter appear.

The accompanying drawing illustrates an embodiment of the invention which will now be described, it being understood that the embodiment illustrated may be modified in certain respects without departing from the spirit and scope of the appended claims.

Figure 2:
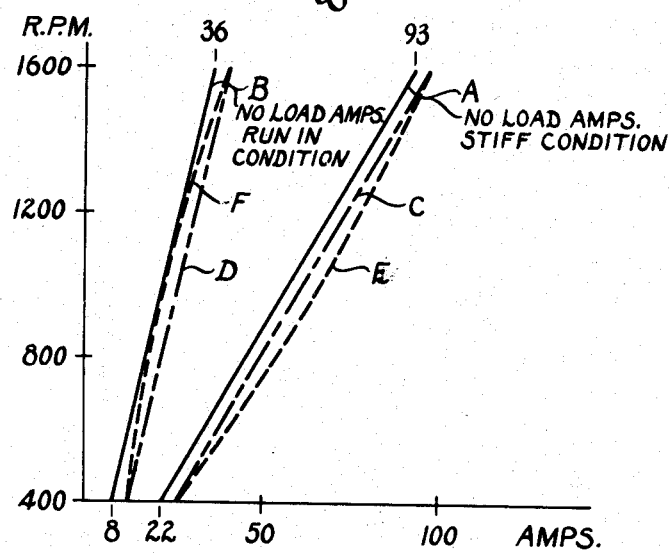

In the drawing,

Figure 1 is a diagrammatic view illustrating an embodiment of the invention in connection with the draw bench controller of the type shown in the aforementioned Newman Patent No. 2,057,909, and Fig. 2 is a diagrammatic view illustrating graphically certain characteristics of the controller shown in Fig. 1.

Referring to Fig. 1, the same illustrates a direct current motor M to be supplied with current from a supply circuit indicated by lines $L^1$, $L^2$, said motor being provided with an armature A, a series field winding F, a stabilizing field winding $F^1$ and a shunt field winding $F^2$. A plurality of accelerating resistances $R^1$, $R^2$ and $R^3$ are connected in the armature circuit of said motor and a speed regulating rheostat 10 is connected in the shunt field circuit thereof.

The armature circuit of motor M is controlled by two sets of normally open direction contactors 11—12 and 13—14, and normally open accelerating switches 15—16 provide for exclusion of resistances $R^1$—$R^2$ while a normally open accelerating switch 17 provides for exclusion of series field F and resistance $R^3$. A normally open electromagnetic accelerating switch 19 having a series coil $19^a$ and a shunt coil $19^b$ is provided for shunting the speed regulating rheostat 10 and the control means for this switch includes a load responsive relay 46 having a series operating winding $46^a$ and a shunt operating winding $46^b$.

It is assumed that motor M is used to drive a draw bench and that the above mentioned switches are controlled as set forth in the Newman Patent No. 2,057,909. As set forth in this patent, motor M is started in its forward direction by closure of direction switches 11—12 and upon starting thereof switches 15—16 and 17 are closed automatically to exclude accelerating resistances $R^1$, $R^2$ and $R^3$ and series field winding F from the armature circuit of the motor. The carriage of the draw bench is normally disconnected from motor M and with said carriage positioned to start a drawing operation, field control switch 19 is held in closed position by energization of its shunt operating winding $19^b$ to shunt the speed regulating rheostat 10. Motor M is thus started and accelerated to base speed and at this speed the armature current in winding $46^a$ is insufficient to effect response of load relay 46.

Upon starting of a drawing operation motor M is connected to the carriage of the draw bench and upon movement of the draw bench carriage out of starting position the shunt operating winding $19^b$ of switch 19 is deenergized and said switch drops out to include speed regulating rheostat 10 in the shunt field circuit of the motor. Motor M then accelerates and during acceleration thereof switch 19 vibrates under the action of its series winding $19^a$ until the motor is brought up to a running speed determined by the setting of speed regulating rheostat 10. The inrush of current in the armature circuit resulting from inclusion of rheostat 10 in the shunt field circuit of the motor effects response of relay 46. Switch 19 remains in open position as long as the load relay 46 is held in its attracted position and upon dropping out of said load relay switch 19 is reclosed by energization of its winding 19b to shunt rheostat 10 for slow-down of the motor to base speed. As will now be set forth, the operating winding 46b of load relay 46 is provided with a speed and load compensating control means to insure immediate dropping out of said relay when the motor becomes unloaded for any reason, as for example if the material breaks during a drawing operation or when the end of the material leaves the die.

In accordance with the present invention the compensating control means for winding 46b includes a main speed compensating potentiometer rheostat 52, an auxiliary speed compensating rheostat 52a, a load compensating potentiometer rheostat 53, a plurality of fixed resistances $R^5$, $R^6$ and $R^7$, and an adjustable resistance $R^8$. Rheostats 52 and 52a are connected in series and rheostat 52 is connected to line $L^1$ while rheostat 52a is connected to line $L^2$ in series with resistance $R^5$. Rheostat 53 is connected to line $L^1$ in series with resistance $R^6$ and to line $L^2$ in series with resistance $R^7$. The adjusting arm of potentiometer rheostat 52 is mechanically connected to the adjusting arm of the shunt field rheostat 10 and the adjusting arm of rheostat 53 is mechanically connected to the adjusting arm of rheostat 52a. The operating winding 46b of load relay 46 is connected between the adjusting arms of rheostats 52 and 53 in series with the adjustable resistance $R^8$ and a Wheatstone bridge circuit is thus provided for controlling the direction and the value of the current in said operating winding by adjustment of the rheostats 52, 52a and 53.

Referring now to Fig. 2, the same represents graphically the no load armature current values for various motor speeds with the draw bench unloaded and in a new or stiff condition and also with the same unloaded and in a run-in condition. As indicated by line A, with the draw bench unloaded and in a stiff condition the armature current varies in a straight line from approximately 22 amps. at 400 R. P. M. to approximately 93 amps. at 1600 R. P. M. Also as indicated by line B, with the draw bench unloaded and in a run-in condition the armature current varies in a straight line from approximately 8 amps at 400 R. P. M. to approximately 36 amps. at 1600 R. P. M. In order to obtain slowdown of motor M immediately upon unloading of the draw bench at various running speeds it is necessary that the load relay 46 drop out at armature current values slightly higher than those represented by line A with the draw bench in a stiff condition and at armature current values slightly higher than those indicated by line B with the draw bench in a run-in condition. These drop out current values are represented by straight lines C and D.

In practice it has been found that while the compensating control means disclosed in the aforementioned Newman Patent No. 2,057,909 can be designed to provide for dropping out of the load relay at proper no load armature current values with the motor operating at given maximum or minimum speeds it is impossible to obtain proper operation of the load relay at intermediate running speeds. Thus by actual test of a typical drawbench installation it was found that the load relay dropped out at armature current values represented by curved dotted line E with the compensating control means set for a stiff condition of the draw bench and at armature current values represented by curved dotted line F with the compensating control means set for a run-in condition of the draw bench. As is apparent, this resulted in erratic operation of the load relay upon unloading of the draw bench at intermediate running speeds.

In accordance with the present invention the auxiliary speed compensating rheostat 52a acts to modify the regulating effect of main speed compensating rheostat 52 upon adjustment of load compensating rheostat 53 to suit different run-in conditions of the draw bench. Also in accordance with the present invention the total resistance of the bridging circuit including coil 46b and adjustable resistance $R^8$ is of a high value and a large part of this resistance is included in said coil.

In practice it has been found that by proper design of rheostats 52, 52a and 53 the direction and value of the current in relay coil 46b can be controlled to effect dropping out of load relay 46 for slowdown of the motor immediately upon unloading of the draw bench at all running speeds, assuming the load compensating rheostat 53 is set to properly compensate for the run-in condition of the draw bench. For example it has been found that the load relay can be controlled to drop out at current values corresponding to line C with load rheostat 53 set to compensate for a stiff condition of the draw bench and at current values corresponding to line D with said load rheostat set to compensate for a run-in condition of the draw bench. Also it has been found that regardless of the size of the driving motor load relay 46 can be designed to drop out immediately upon unloading of the draw bench at all running speeds without change in the design of compensating rheostats 52, 52a and 53. In some instances it is necessary in order to obtain proper operation of the load relay to vary the slope of its drop out characteristic and such variation is effected by adjustment of resistance $R^8$.

It should be noted that the above described relay control is not limited to use in connection with draw bench controllers but may be used in controllers for wire drawing machines to effect stopping of the machine upon breaking of the wire during a drawing operation.

What I claim as new and desire to secure by Letters Patent is:

1. The combination with a direct current motor and a machine driven thereby, of means for starting said motor and for effecting operation thereof at selected speeds with said machine in a loaded condition, a relay associated with said means for checking the speed of said motor upon unloading of said machine, said relay having a pair of control windings one of which is connected in series in the armature circuit of said motor, and means including a plurality of adjustable rheostats for controlling the current in the other of said operating windings to render said relay responsive under the action of said series winding to check the speed of said motor immediately upon unloading of said machine at all running speeds of said motor, one of said rheostats being adjustable to regulate the current in said last mentioned winding in accordance with the speed of said motor and certain other of said rheostats being mechanically connected and being adjustable to vary the regulating effect of said first mentioned rheostat to maintain for all motor speeds a substantially uniform difference between the no load armature current values and the armature current values at which said relay responds with said machine either in a stiff or a run-in condition.

2. The combination with a direct current motor and a machine driven thereby, of means for starting said motor and for effecting operation thereof at selected speeds with said machine in a loaded condition, a relay associated with said means for checking the speed of said motor, said relay having a pair of operating windings one of which is connected in series in the armature circuit of said motor and a Wheatstone bridge circuit for controlling the current in the other of said operating windings to render said relay responsive under the action of said series winding to check the speed of said motor immediately upon unloading of said machine at all running speeds of said motor with said machine either in a stiff or a run-in condition, said Wheatstone bridge circuit including a plurality of adjustable resistances, one of said resistances being adjustable to vary the current in said last mentioned operating winding in accordance with the speed of said motor and certain other of said resistances being adjustable simultaneously to vary the regulating effect of said first mentioned resistance to compensate for either stiff or a run-in condition of said machine.

3. The combination with a direct current motor and a machine driven thereby, of means for starting said motor and for effecting operation thereof at selected speeds with said machine in a loaded condition, a relay associated with said means for checking the speed of said motor upon unloading of said machine, said relay having a pair of control windings one of which is connected in series in the armature circuit of said motor, and a Wheatstone bridge circuit for controlling the current in the other of said operating windings to render said relay responsive under the action of said series winding to check the speed of said motor immediately upon unloading of said machine at all running speeds of said motor, said Wheatstone bridge circuit including a plurality of regulating resistances, certain of said resistances being adjustable to regulate the current in said last mentioned winding in accordance with the speed of said motor and certain being adjustable to vary the regulating effect of said first mentioned resistance to maintain for all motor speeds a substantially uniform difference between the no load armature current values and the armature current values at which said relay responds with said machine either in a stiff or a run-in condition.

ERIC PELL.